UNITED STATES PATENT OFFICE.

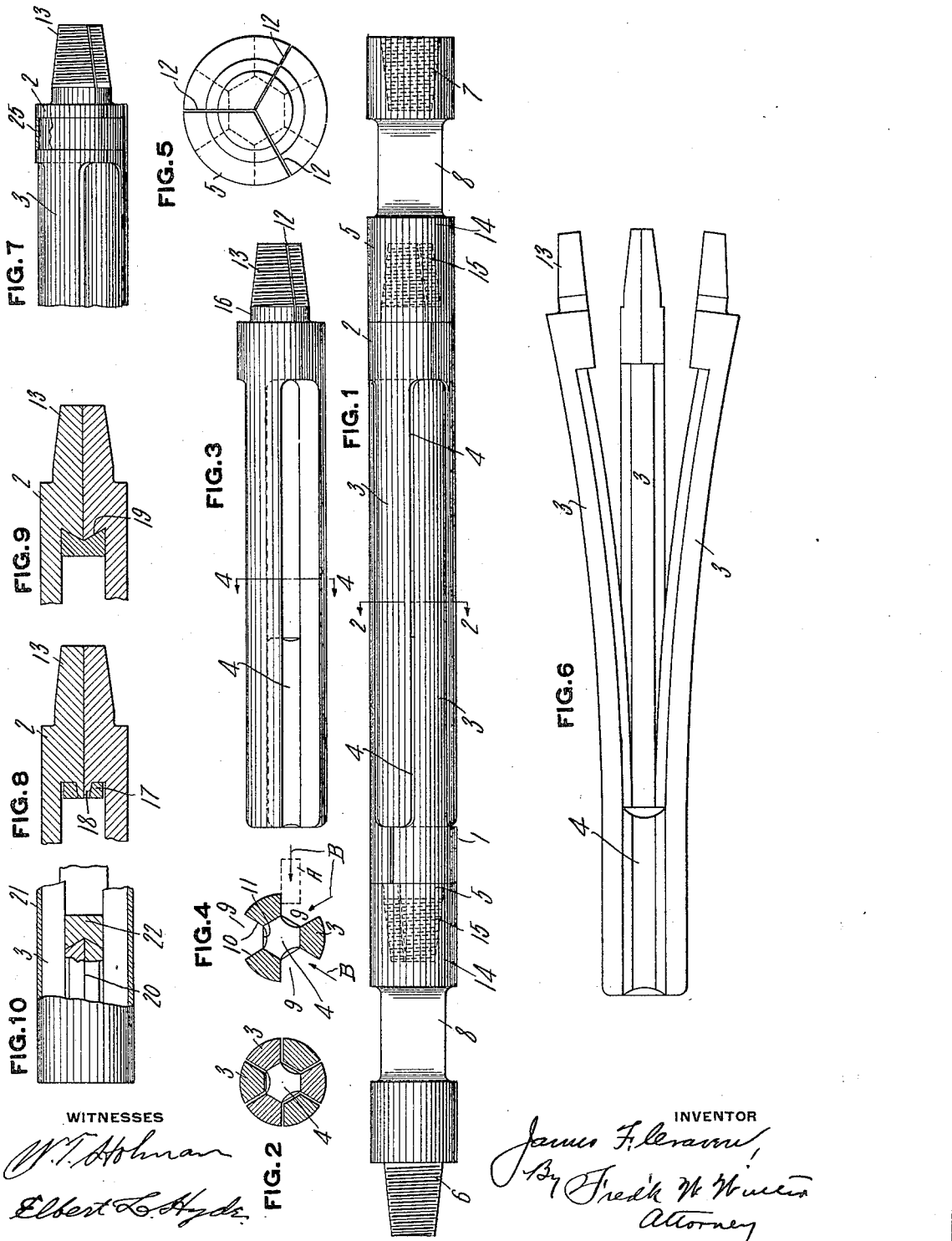
J. F. CRAVEN.
WELL DRILL JAR.
APPLICATION FILED SEPT. 1, 1914.
1,133,841.
Patented Mar. 30, 1915.

JAMES F. CRAVEN, OF ZELIENOPLE, PENNSYLVANIA.

WELL DRILL-JAR.

1,133,841.  Specification of Letters Patent.  Patented Mar. 30, 1915.

Application filed September 1, 1914. Serial No. 859,647.

*To all whom it may concern:*

Be it known that I, JAMES F. CRAVEN, a resident of Zelienople, in the county of Butler and State of Pennsylvania, have invented a new and useful Improvement in Well Drill-Jars, of which the following is a specification.

This invention relates to well drill jars, and the method of making the same.

The object of the invention is to provide a strong, durable drill jar which is not liable to break in use, which is of the maximum strength possible to obtain in any size of drill jar, in which the links are accurately guided by each other, and which drill jar can be readily manufactured economically and by a simple method in such manner as to avoid the liability of unequal internal strains in different parts of the drill jar and the bad effects of welding or overheating.

In the drawings, Figure 1 is a side elevation of one form of drill jar; Fig. 2 is a cross section on the line 2—2, Fig. 1, looking in the direction of the arrows; Fig. 3 is a side view of one link; Fig. 4 is a cross section on the line 4—4, Fig. 3, looking in the direction of the arrows; Fig. 5 is an end view from the right in Fig. 3 and on a larger scale; Fig. 6 is a side elevation, showing the assembling of two links; Fig. 7 is a detail view corresponding to Fig. 1, and partly in longitudinal section, and showing a modified form of the invention; and Figs. 8, 9 and 10 are detail views, showing modifications.

In the drawings, the drill jar is shown with links having three reins each, and while this is a desirable form of drill jar it will be understood that this is merely illustrative, as the links may be provided with any suitable number of reins, such as two, three, four or more, and the reins may be of any desired shape in cross section.

The drill jar shown in the drawings is composed of two links marked 1 and 2, each of which has three reins 3, an anvil member 4 at one end, and a shank or head 5 at the other end. The shank or head of one of the links is formed as or provided with a tang 6 for attachment to the operating rod, cable or like member, and that on the other link is provided with a socket 7 for receiving the shank of the drilling tool, both shanks or heads being provided with wrench receiving portions 8.

Each link is made of a solid bar, or in some cases of two members, as more fully hereinafter described. This bar is preferably made of some tough high carbon steel or other suitable metal which will stand the hard blows and rough usage to which the jars are subjected in use. Said bar is first turned down to cylindrical form, or may be initially rolled or drawn in such shape, the diameter of the bar being the maximum diameter that can be received in the hole to be drilled. It is then grooved longitudinally from one end to a point short of the other end, the several grooves thus formed being spaced around the circumference of the bar at intervals, depending upon the number of reins in each link. In the drawings, three grooves 9 are shown. These grooves may be formed by hammering or swaging the bar, but preferably by a suitable milling tool. The sides of the grooves, indicated at 10, lie in radial planes, and their inner surfaces, marked 11, are normal to radial lines passing through the centers of the grooves.

A portion of the bar intermediate its ends is then separated into a plurality of longitudinally extending members in order to form the anvil, reins and shank or head, and thereby leaving the original grain of the metal undisturbed so that it remains longitudinal in all parts of the finished link. This may be done in any suitable manner, such as by swaging, but preferably is done by a punching or slotting operation which may, for example, be effected by a punching tool such as indicated in dotted lines at A, Fig. 4, and which is passed three times through the bar, between each two of the grooves 9 in the directions indicated by the arrows B, so as to remove the central portion of the bar between its ends. The anvil 4 may be made of any suitable length by leaving the proper length at the end portion of the bar untouched at its center and consequently may be made as heavy and strong as desired. Furthermore, the metal of the anvil is left in its original condition with the direction of the grain unchanged and lying lengthwise of the jar and consequently is in the best possible condition to withstand the endwise blows to which it is subjected and is better able to resist upsetting or lateral expansion than when the grain of the metal in the anvil is transverse to the length of the jaw. The several reins are left separate between the ends of the bar and are integrally connected to both the anvil and shank or head and, the latter of which may also be of any length and weight. The grooves 9 extend clear through the anvil end of the link, but the head end is left ungrooved, as will be readily understood.

To enable each link to be assembled with its mate, one or the other of the solid ends of the bar is then slitted or sawed along three radial planes, which preferably coincide with the grooves 9 between the reins, the slits thus formed being indicated at 12. This divides the slitted end of the bar into three parts, each of which is integral with one of the rein bars. By slitting the bar in this manner any inequality in the internal strains or stresses in the three reins, such as might be due to variation in treatment of different portions of the bar when formed, is wholly relieved, and each rein assumes a perfectly normal condition without internal strain or stress therein.

Either end of the link may be slitted in the manner described, but when the anvil end is slitted then it is necessary to only slit one of the two links of a set, while when the head end is slitted both links must be slitted, as will more fully appear hereinafter.

Assuming that the head end has been split, as in Fig. 3, and that two links have been formed in the manner described, the reins thereof are opened, by bending them radially outwardly, preferably while at a low bending heat in order to prevent the liability of injuring the metal by overheating the same. The reins are opened out, as shown in Fig. 6, to such an extent that the open end of one link will pass beyond the closed end of the other. The two partially formed links are then interlocked by passing the open end of each over the closed end of the other, after which the opened ends of the reins are bent back to original position.

The grooves 9 are made slightly wider than the reins produced by forming said grooves, in order that when the two links are interlocked, as described, the reins of each will slide easily in the grooves of the other, but only a slight clearance is necessary for this purpose. Consequently the links are guided accurately by each other and slide longitudinally without lost motion of rotation with respect to each other, and without the liability of one link becoming tilted or askew with respect to the other. The head may be made long enough so that the wrench receiving portion 8 and tang 6 or socket 7 are integral with the reins, but preferably is made in two parts so that the wrench receiving portion is not a part of the reins, which thereby prevents separating or spreading them by the twisting action of the wrench. As shown, the head end of the link is turned down to form a tang 13, which is preferably frusto-conical and threaded for connection either directly to the drilling tool, rope or cable, or to a separate solid member 14 having a socket 15 to receive the shank 13, and which is flattened intermediate its ends to form the wrench hold 8 and is provided with the tang 6 or socket 7 at its other end. The shank 13 is also provided with a cylindrical portion 16 which fits closely within a cylindrical portion of the socket 15. After the reins have been closed together and the solid end portions thereof have been turned down to form the shank 13 the member 14 is screwed thereon, and the shoulder surrounding the cylindrical portion of the shank forms a collar which securely binds the three parts of the shank together and prevents them from spreading. The free ends of the reins may also be held together by other or additional means, such as by shrinking a collar 25 around the split portion of the head or shank, as in Fig. 7. Or, if desired, a ring or collar 17 may be placed between the reins and around or over projecting portions 18 of the head, as in Fig. 8. Such ring will be put in place just before closing the reins together. It may have a beveled or conical inner surface, as at 19, Fig. 9, in order to draw the reins together on impact.

In this jar either or both of the links may be provided with detachable shank or head members, such as that shown at 14, Fig. 1, and the detachable portion may be made of a different and cheaper kind of steel from the other portions of the links.

In the jar described the anvil ends of the links are solid members which are integral with the reins of the links and in which the original longitudinal grain of the metal is not disturbed. The heads or shanks are also portions of the links and are held tightly together in such a manner that there is no liability of their becoming separated or spreading. Each rein of the links is in a normal condition and without strain or stress therein, so that it takes its own share of the load and is not liable to warp or bend. Furthermore, the bar does not have to be heated to a welding or forging heat in forming the same, but merely to a bending heat, and there are no welds therein, so that the jar is of full strength and will not break. The jar is of maximum cross section throughout and at least as strong in every part as the joints between the jar and rope or cable and between the jar and drilling tool. These joints are unavoidable and ordinarily do not fail in practice so that the jar will last as long at least as the threaded joints or drilling tools.

In some cases it is desirable to split the jar at the anvil end, instead of at the shank or head end, as in Fig. 1. In this case the wrench holding portions and shank and socket are made integral with the head or shank. It is only necessary to split the anvil end of one of the links, as at 20, Fig. 10, the reins being then opened and passed beyond the end of the other link, after which the reins are closed upon each other. In this case the several parts of the anvil end of the link which has been split are held together in any suitable manner, such as by a sleeve or band 21 which is placed around the link and is secured thereto in any suitable manner, such as by riveting or by shrinking it thereon, it being understood that the link with the split anvil is made slightly larger in cross section than the other link, in order to provide a clearance between the sleeve or band 21 and the reins of the other link. The several parts of the anvil may also be held together by an inner ring 22, which is of the same type as that shown in Figs. 8 and 9.

What I claim is:—

1. A drill jar, comprising two links each formed from a single integral piece of metal divided longitudinally to form the reins and split at one end, said links being interlocked with each other and each being provided with a threaded shank at one end, the grain of the metal in the anvil extending longitudinally of the jar.

2. A drill jar, comprising two links each formed of a single integral piece of metal provided with grooves and separated into a plurality of parts intermediate its ends to form reins, said jars being interlocked with the reins of one sliding in the grooves of the other, at least one of said links having one end split to form a plurality of parts one integral with each rein, the grain of the metal in the anvil extending longitudinally of the jar.

3. A drill jar, comprising two links each formed of a single piece of metal divided longitudinally to form three reins, said reins being connected at one end and separated at the other, and means for securing the separate ends of the links to each other.

4. A drill jar, comprising two links each formed of a single piece of metal divided longitudinally to form reins, said links being interlocked, and a head member connected to the split end of each link and provided with a wrench hold.

5. A drill jar, comprising two links each formed of a single piece of metal divided longitudinally to form reins, said links being interlocked, a collar for holding together the split ends of each link, and a head member connected to each link.

6. A drill jar, comprising two links each formed of a single piece of metal divided longitudinally to form reins, said links being interlocked, a collar for holding together the split ends of each link, and a head member connected to each link and provided with a wrench hold.

7. The method of making drill jars, consisting in forming a plurality of longitudinal grooves in a bar, separating a portion of the bar intermediate its ends into a plurality of parts to form the reins, splitting the bar at one end between the reins, opening the reins at their free ends, assembling two links, and closing the reins upon each other.

8. The method of making drill jars, consisting in forming a plurality of longitudinal grooves in a bar, separating a portion of the bar intermediate its ends into a plurality of parts to form the reins, splitting the bar at one end between the reins, opening the reins at their free ends, assembling two links, closing the reins upon each other, and forming shanks upon the ends of the links.

In testimony whereof, I have hereunto set my hand.

JAMES F. CRAVEN.

Witnesses:
WILLIAM B. WHARTON,
ELBERT L. HYDE.

Copies of this patent may be obtained for five cents each, by addressing the "Commissioner of Patents, Washington, D. C."